United States Patent
Kim et al.

(10) Patent No.: US 9,620,798 B2
(45) Date of Patent: Apr. 11, 2017

(54) HUMIDIFICATION DEVICE FOR FUEL CELL AND FUEL CELL SYSTEM COMPRISING THE SAME

(71) Applicant: Hyundai Motor Company, Seoul (KR)

(72) Inventors: Hyunyoo Kim, Seoul (KR); Hyuckroul Kwon, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 118 days.

(21) Appl. No.: 14/555,759

(22) Filed: Nov. 28, 2014

(65) Prior Publication Data

US 2016/0036074 A1 Feb. 4, 2016

(30) Foreign Application Priority Data

Aug. 1, 2014 (KR) .................. 10-2014-0099206

(51) Int. Cl.
| | | |
|---|---|---|
| *H01M 8/04* | (2016.01) | |
| *H01M 8/04291* | (2016.01) | |
| *B60L 11/18* | (2006.01) | |
| *H01M 8/04089* | (2016.01) | |
| *H01M 8/04119* | (2016.01) | |
| *B01D 63/02* | (2006.01) | |

(52) U.S. Cl.
CPC ......... *H01M 8/04291* (2013.01); *B60L 11/18* (2013.01); *H01M 8/04097* (2013.01); *H01M 8/04141* (2013.01); *H01M 8/04149* (2013.01); *B01D 63/02* (2013.01); *H01M 2250/20* (2013.01); *Y02T 90/32* (2013.01)

(58) Field of Classification Search
CPC ......... H01M 8/04291; H01M 8/04097; H01M 8/04141; H01M 8/04149; H01M 2250/20; B60L 11/18; B01D 63/02; Y02E 60/50
See application file for complete search history.

(56) References Cited

U.S. PATENT DOCUMENTS

| 5,432,020 A | 7/1995 | Fleck |
| 6,635,374 B1 | 10/2003 | Aramaki |

FOREIGN PATENT DOCUMENTS

| EP | 1 469 546 A2 | 10/2004 |
| JP | 3928948 B2 | 6/2007 |
| KR | 10-1028030 B1 | 4/2011 |
| KR | 10-2012-0020461 A | 3/2012 |
| KR | 10-2012-0124666 A | 11/2012 |

OTHER PUBLICATIONS

Machine translation of KR 10-2012-0124666, retrieved from <http://kposd.kipo.go.kr:8088/up/kpion/> on Aug. 15, 2016.*

* cited by examiner

*Primary Examiner* — Cynthia K Walls
(74) *Attorney, Agent, or Firm* — Mintz Levin Cohn Ferris Glovsky and Popeo, P.C.; Peter F. Corless (57) ABSTRACT

Disclosed herein is a humidification device for a fuel cell. The humidification device for a fuel cell, which performs membrane humidification of exhaust gas exhausted from a cathode of a fuel cell and dried air supplied through an air compressor and supplies the humidified air to the cathode, includes: a main membrane module including several bundles of first hollow-fiber membranes disposed in the main membrane module and a sub-membrane module connected to the main membrane module and including several bundles of second hollow fiber membranes disposed in the sub-membrane module.

14 Claims, 5 Drawing Sheets

HUMIDIFICATION DEVICE FOR FUEL CELL AND FUEL CELL SYSTEM COMPRISING THE SAME

CROSS-REFERENCE TO RELATED APPLICATION

This application claims priority to and the benefit of Korean Patent Application No. 10-2014-0099206 filed in the Korean Intellectual Property Office on Aug. 1, 2014, the entire contents of which are incorporated herein by reference.

TECHNICAL FIELD

The present invention relates to a fuel cell system of a fuel cell vehicle. In particular, the present invention relates to a humidification device for humidifying reaction gas supplied to the fuel cell.

BACKGROUND

In general, a fuel cell system is a power generation system generating electric energy through an electrochemical reaction of hydrogen and oxygen in the air by a fuel cell. For example, the fuel cell system is applied to a fuel cell vehicle to drive a vehicle by operating an electric motor.

The fuel cell system includes a stack formed of an electricity generation assembly of unit fuel cells composed of a cathode and an anode, an air supply device for supplying air to the cathode of the fuel cell, and a hydrogen supply device for supplying hydrogen to the anode of the fuel cell.

Meanwhile, in a polymer fuel cell, appropriate moisture is provided such that an ion exchange membrane of a membrane-electrode assembly (MEA) may smoothly operate. As such, the air supply device of the fuel cell system includes a humidification device for humidifying air supplied to the fuel cell.

For example, the humidification device humidifies dried air supplied through an air compressor of the air supply device using moisture in high temperature and high humidity air exhausted from the cathode of the fuel cell, and supplies the humidified air to the cathode of the fuel cell.

As the humidification device, various types of the humidification devices such as a bubbler type humidification device, an injection type humidification device, a plate type humidification device, an adsorbent type humidification device, and a membrane type humidification device, and the like have been developed. However, for the fuel cell used for a vehicle, since a package thereof is limited, the membrane-type humidification device having a reduced volume has been applied. The membrane-type humidification device as described above has an advantage in that the membrane-type humidification device does not require special power as well as the advantage in view of the package.

In the membrane-type humidification device (hereinafter, referred to as "membrane humidification device" for convenience), humidification is performed by exchange moisture between a gas to gas, such as between high temperature and high humidity exhaust gas exhausted from the cathode of the fuel cell and dried air supplied through the air compressor.

However, as compared to other types of the humidification devices, the membrane humidification device has reduced volume, but during exchanging moisture between gas and gas, the membrane humidification device may still have a substantial volume as a vehicle component, the membrane humidification device may be disadvantageous in the package.

Further, according to the related art, water may be condensed in the humidification device due to functional characteristics of the membrane humidification device. Since the condensed water as described above may freeze in cold weather conditions, an air channel in the humidification device may decrease, such that a load of the air compressor may increase due to an increase in pressure, and thus, power consumption of the air compressor may increase. Accordingly, fuel efficiency of the fuel cell vehicle may deteriorate.

Further, when the condensation water in the humidification device freezes in cold weather conditions, a membrane module of the humidification device may be damaged by volume expansion of the frozen condensation water, and humidification performance of the humidification device may deteriorate.

Meanwhile, a temperature of air compressed by the air compressor at the time of high power operation of the stack increases to about 100 to 150° C. due to high compression ratio and a substantial amount of air.

Since the temperature of the compressed air as described above is greater than a normal operation temperature of about 60 to 80° C. of the stack, the temperature acts as a disadvantageous condition on humidification efficiency of the humidification device and operation efficiency of the stack. As such, in the fuel cell system, the elevated temperature from compressed air supplied to the humidification device by the air compressor needs to be reduced.

Further, in a turbo type air compressor rotating at a high speed, the cooling of a motor rotating an impeller and a bearing supporting a rotation shaft of the motor may be important design factors determining performance and a lifetime of the entire device.

Particularly, in the motor, when heat generated in a coil winding and a magnet of a rotor is not suitably cooled, the coil may be damaged or insulation may be degraded. Further, when a rare earth element based magnet is used in the motor, since the magnet may deteriorate due to high temperature demagnetization, the cooling of the magnet may be also important.

In addition, the bearing for supporting the rotation shaft is applied to the motor of the air compressor. Although various kind of bearings have different temperature ranges, but suitable temperatures may be determined according to the kind or a material of the bearing and the bearing also may be appropriately cooled.

As such, according to the related art, an intercooler, water pump, and/or the like are installed in an air supply path connecting the air compressor and the humidification device as an example of a cooling unit for cooling air supplied from the air compressor.

However, according to the related art, the cooling units such as intercooler, the water pump, and/or the like are additionally installed for cooling the air compressed by the air compressor as the air supply device for supplying air to the stack, which may be disadvantageous in view of the package of the entire fuel cell system.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a humidification device for a fuel cell which may separately circulate humidified humidification air to an air inflow end of an air compressor and humidification air supplied to cathodes of fuel cells.

In addition, the present invention provides a fuel cell system which may circulate separately humidified humidification air to an air inflow end of an air compressor to cool the air compressor in an air supply system, thereby improving humidification performance.

In an exemplary embodiment of the present invention, provide is a humidification device for a fuel cell, which may perform membrane humidification of exhaust gas exhausted from a cathode of a fuel cell and dried air supplied through an air compressor, and further supply the humidification air to the cathode. The humidification device may include: a main membrane module including several bundles of first hollow-fiber membranes densely disposed or concentrated in the main membrane module; and a sub-membrane module connected to the main membrane module and including several bundles of second hollow-fiber membranes densely disposed or concentrated in the sub-membrane module.

The humidification device for a fuel cell according to an exemplary embodiment of the present invention may supply humidification air exhausted from the main membrane module to the cathode of the fuel cell.

The humidification device for a fuel cell according to an exemplary embodiment of the present invention may supply humidification air exhausted from the sub-membrane module to an air inflow end of the air compressor.

In the humidification device for a fuel cell according to an exemplary embodiment of the present invention, the sub-membrane module may be connected to the air inflow end of the air compressor through a circulation line and supply the humidification air to the air inflow end of the air compressor through the circulation line.

In the humidification device for a fuel cell according to an exemplary embodiment of the present invention, the sub-membrane module may be connected to a dried air supply line for supplying the dried air compressed in the air compressor to the main membrane module, but be connected to an air output end of the air compressor through a divergence line diverged from the dried air supply line.

In the humidification device for a fuel cell according to an exemplary embodiment of the present invention, the main membrane module and the sub-membrane module may be provided integrally with each other in a single housing.

In the humidification device for a fuel cell according to an exemplary embodiment of the present invention, the main membrane module and the sub-membrane module may be partitioned from each other by a partition wall in the housing.

In the humidification device for a fuel cell according to an exemplary embodiment of the present invention, the housing may include: a first inflow part introducing dried air supplied through the air compressor into the main membrane module; a second inflow part introducing a portion of the dried air supplied through the air compressor into the sub-membrane module; a third inflow part introducing the exhaust gas exhausted from the cathode of the fuel cell into the main membrane module; a fourth inflow part formed in the partition wall, connecting the main membrane module and the sub-membrane module to each other and introducing the exhaust gas into the sub-membrane module; a first exhaust part exhausting the humidification air humidified in the main membrane module; a second exhaust part exhausting the humidification air humidified in the sub-membrane module; and a third exhaust part exhausting exhaust gas in which moisture is removed while the exhaust gas passes through the sub-membrane module from the main membrane module.

In the humidification device for a fuel cell according to an exemplary embodiment of the present invention, the first inflow part may be connected to an air output end of the air compressor through a dried air supply line.

In the humidification device for a fuel cell according to an exemplary embodiment of the present invention, the second inflow part may be connected to the air output end of the air compressor through a divergence line diverged from the dried air supply line.

In the humidification device for a fuel cell according to an exemplary embodiment of the present invention, the second exhaust part may be connected to the air inflow end of the air compressor through a circulation line.

In the humidification device for a fuel cell according to an exemplary embodiment of the present invention, the fourth inflow part may be formed of a connection hole connecting the main membrane module and the sub-membrane module to each other.

In another aspect, the present invention provides a fuel cell system which may include: a stack formed of an electricity generation assembly of unit fuel cells; an air compressor for supplying air to a cathode of a fuel cell; a humidification device connected to the air compressor and performing membrane humidification of exhaust gas exhausted from the cathode and dried air supplied through the air compressor; and a hydrogen tank for supplying hydrogen to an anode of the fuel cell. In particular the humidification device may include: a main membrane module including several bundles of first hollow-fiber membranes densely disposed or concentrated in the main membrane module; and a sub-membrane module connected to the main membrane module and including several bundles of second hollow-fiber membrane densely disposed or concentrated in the sub-membrane module.

In the fuel cell system according to an exemplary embodiment of the present invention, humidification air exhausted from the sub-membrane module may be supplied to an air inflow end of the air compressor through a circulation line and dried air compressed in the air compressor may be cooled by the humidification air.

In the fuel cell system according to an exemplary embodiment of the present invention, the humidification device may supply the dried air supplied from the air compressor to the main membrane module through a dried air supply line.

In the fuel cell system according to an exemplary embodiment of the present invention, the humidification device may supply a portion of the dried air to the sub-membrane module through a divergence line diverged from the dried air supply line.

In the fuel cell system according to an exemplary embodiment of the present invention, the humidification device may supply the humidification air exhausted from the main membrane module to the cathode of the fuel cell through a humidification air supply line.

In the fuel cell system according to an exemplary embodiment of the present invention, the humidification device may supply humidification air exhausted from the sub-membrane module to an air inflow end of the air compressor through a circulation line.

In the fuel cell system according to an exemplary embodiment of the present invention, the main membrane module and the sub-membrane module may be provided integrally with each other in a single housing and partitioned from each other by a partition wall in the housing.

In the fuel cell system according to an exemplary embodiment of the present invention, the housing may include: a first inflow part introducing the dried air supplied through the air compressor into the main membrane module; a second inflow part introducing a portion of the dried air supplied through the air compressor into the sub-membrane module; a third inflow part introducing the exhaust gas exhausted from the cathode of the fuel cell into the main membrane module; a fourth inflow part formed in the partition wall, connecting the main membrane module and the sub-membrane module to each other and introducing the exhaust gas into the sub-membrane module; a first exhaust part exhausting the humidification air humidified in the main membrane module; a second exhaust part exhausting the humidification air humidified in the sub-membrane module; and a third exhaust part exhausting exhaust gas in which moisture is removed while the exhaust gas passes through the sub-membrane module from the main membrane module.

In the fuel cell system according to an exemplary embodiment of the present invention, the first inflow part may be connected to an air output end of the air compressor through a dried air supply line.

In the fuel cell system according to an exemplary embodiment of the present invention, the second inflow part may be connected to the air output end of the air compressor through a divergence line diverged from the dried air supply line.

In the fuel cell system according to an exemplary embodiment of the present invention, the third inflow part may be connected to the cathode of the fuel cell through an air exhaust line.

In the fuel cell system according to an exemplary embodiment of the present invention, the first inflow part may be connected to the cathode of the fuel cell through a humidification air supply line.

In the fuel cell system according to an exemplary embodiment of the present invention, the second exhaust part may be connected to the air inflow end of the air compressor through a circulation line.

Preferred vehicles of the present invention may comprise the fuel cell system as described herein.

According to various exemplary embodiments of the present invention, as the humidification air exhausted from the sub-membrane module is circulated to the air inflow end of the air compressor, a temperature of air compressed in the air compressor may be reduced, and configuration components of the air compressor may be cooled by the compressed air of which the temperature is cooled, thereby improving aerodynamic performance and efficiency of the air compressor.

In addition, according to various exemplary embodiments of the present invention, as the humidification air exhausted from the sub-membrane module is circulated to the air inflow end of the air compressor, a relative humidity of the air supplied to the humidification device may increase, such that a load of the humidification device may decrease, humidification performance of the humidification device may be improved, and a size of the humidification device may be decreased.

Further, according to various exemplary embodiments of the present invention, since the air compressor is cooled by circulating the humidification air exhausted from the sub-membrane module to the air inflow end of the air compressor, a separate cooling unit such as an intercooler, a water pump, and the like, as in the related art may be omitted, and the size of the humidification device may decrease by increasing the relative humidity of the air supplied to the humidification device, thereby reducing the package of the entire fuel cell system.

BRIEF DESCRIPTION OF THE DRAWINGS

The accompanying drawings are provided in order to describe exemplary embodiments of the present invention, such that technical idea of the present invention is not limited to the accompanying drawings.

Reference numerals set forth in the FIGS. 1-5 include reference to the following elements as further discussed below:

| | | | |
|---|---|---|---|
| 10 | stack | 11 | fuel cell |
| 12 | membrane-electrode assembly | 13 | cathode |
| 15 | anode | 30 | air compressor |
| 50 | hydrogen tank | 71 | dried air supply line |
| 73 | divergence line | 75 | air exhaust line |
| 77 | humidification air supply line | 79 | circulation line |
| 100 | fuel cell system | 110 | housing |
| 115 | partition wall | 131 | first inflow part |
| 132 | second inflow part | 133 | third inflow part |
| 134 | fourth inflow part | 136 | connection hole |
| 151 | first exhaust part | 152 | second exhaust part |
| 153 | third exhaust part | 200 | humidification device |
| 210 | main membrane module | 211 | first hollow-fiber membrane |
| 230 | sub-membrane module | 231 | second hollow-fiber membrane |

DETAILED DESCRIPTION

The present invention will be described more fully hereinafter with reference to the accompanying drawings, in which exemplary embodiments of the invention are shown, so that those skilled in the art may easily practice the present invention. As those skilled in the art would realize, the described embodiments may be modified in various different ways, all without departing from the spirit or scope of the present invention.

In order to clarify the present invention, parts that are not connected with the description will be omitted, and the same elements or equivalents are referred to with the same reference numerals throughout the specification.

The size and thickness of each element are arbitrarily shown in the drawings for convenience of explanation, but the present invention is not necessarily limited thereto, and in the drawings, the thickness of portions, regions, etc. are exaggerated for clarity.

Moreover, the use of the terms first, second, etc. are used to distinguish one element from another, and are not limited to the order in the following description.

In addition, unless explicitly described to the contrary, the word "comprise" and variations such as "comprises" or "comprising", will be understood to imply the inclusion of stated elements but not the exclusion of any other elements.

Further, the terms 'unit', 'means', '-er (-or)', 'member', etc., described in the specification indicate a comprehensive configuration unit for performing at least one function or operation.

Figure 1:
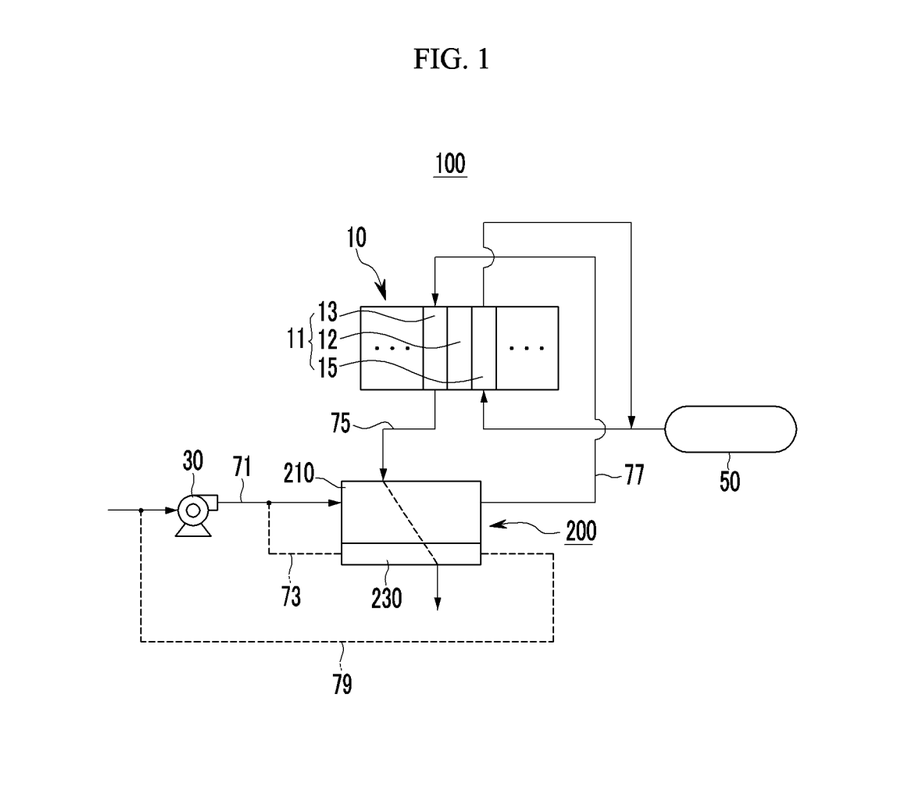
FIG. 1 shows an exemplary fuel cell system according to an exemplary embodiment of the present invention.

FIG. 1 shows an exemplary fuel cell system according to an exemplary embodiment of the present disclosure.

As shown in FIG. 1, the fuel cell system 100 according to an exemplary embodiment of the present invention generates electric energy by electrochemical reactions of hydrogen as fuel and air as an oxidant. The fuel cell system 100 may be included, but not limited to, in a fuel cell vehicle.

The fuel cell system 100 according to an exemplary embodiment of the present invention includes a stack 10, an air compressor 30, a humidification device 200, and a hydrogen tank 50, and each of the components will be described below.

The stack is formed of an electricity generation assembly of unit fuel cells where cathode 13 and an anode 15 and a separator which is also referred to as "separating plate" or bipolar plate" in the art are disposed at both sides of a membrane-electrode assembly (MEA) 12.

In the cathodes 13 of the fuel cells 11, high temperature and high humidity air (hereinafter, also referred to as "exhaust gas") is exhausted, and in the anodes 15 of the fuel cells, high temperature and high humidity hydrogen is exhausted as unreacted hydrogen.

The air compressor 30 supplying air to the cathodes 13 of the fuel cells 11 sucks oxygen in the air (hereinafter, referred to as "dried air") and compresses the dried air to supply the compressed air to a humidification device 100 to be described below.

Since the air compressor 30 compresses dried air at a high compression ratio at high power operation of the stack 10, a temperature of the compressed air may increase, which may have negative influences on humidification efficiency of the humidification device 200 and operation efficiency of the stack 10. Further, heat may be generated in configuration components such as a compression part, a driving motor, a bearing, and the like.

In the humidification device 200 according to an exemplary embodiment of the present invention, membrane humidification of the exhaust gas exhausted from the cathodes 13 of the fuel cells 11 and the dried air supplied from the air compressor 30 may be performed by exchanging moisture between gas and gas and the humidified air (hereinafter, referred to as "humidification air") may be supplied to the cathodes 13 of the fuel cells 11. In particular, the humidification device 200 may be connected to the air compressor 30 through a dried air supply line 71.

A detailed description of a figuration of the humidification device 200 for a fuel cell according to an exemplary embodiment of the present invention will be provided below with reference to FIG. 2.

The hydrogen tank 30 supplying hydrogen to the anodes 15 of the fuel cells 11 may store hydrogen and supply the hydrogen to the anode 15.

Since configurations of the stack 10, the air compressor 30, and the hydrogen tank 50 as described above are generally known in the art, a detailed description thereof will be omitted in the present specification.

In the fuel cell system 100 according to an exemplary embodiment of the present invention, the humidification device 200 for a fuel cell capable of separately circulating the humidified humidification air to an air inflow end of the air compressor 30 and supplying the humidification air to the cathodes 13 of the fuel cells 11 may be provided.

In addition, the humidification device 200 for a fuel cell capable of separately circulating the humidified humidification air to the air inflow end of the air compressor 30 to cool the air compressor 30 in an air supply system and improve humidification performance is provided, and the fuel cell system 100 comprising the humidification device 200 may also be provided.

Hereinafter, a configuration of the humidification device 200 applied to a fuel cell according to an exemplary embodiment of the present invention will be described in detail with reference to the accompanying drawings.

Figure 2:
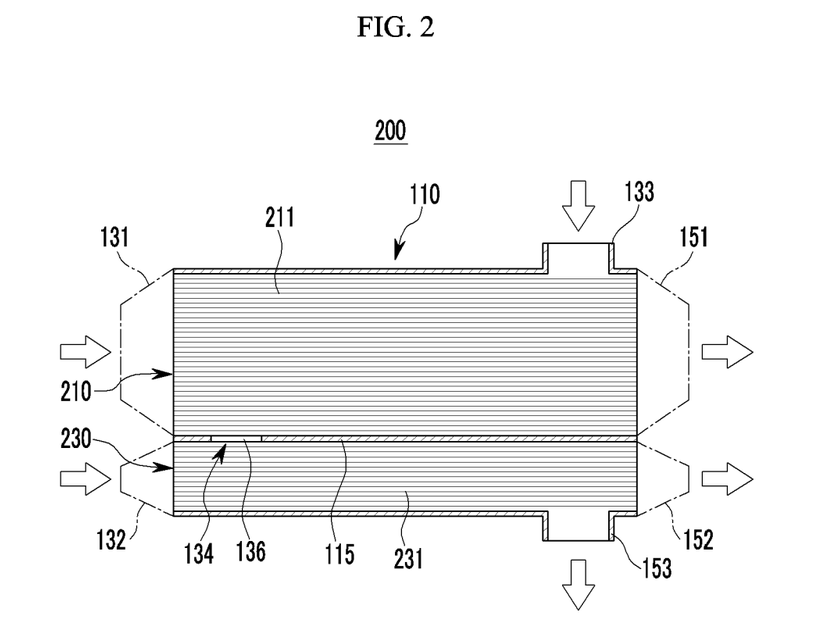
FIG. 2 shows a cross-sectional configuration which schematically illustrates an exemplary humidification device for an exemplary fuel cell according to an exemplary embodiment of the present invention.

FIG. 2 is a cross-sectional configuration diagram showing an exemplary humidification device for an exemplary fuel cell according to an exemplary embodiment of the present invention.

As shown in FIGS. 1 and 2, the humidification device 200 for a fuel cell according to an exemplary embodiment of the present invention may include a housing 110 and a main membrane module 210 and a sub-membrane module 230 integrally provided with each other in the housing 110, and each of the configurations will be described as follows.

According to an exemplary embodiment of the present invention, in the housing 110, a main membrane module 210 and a sub-membrane module 230 may be provided integrally with each other, and the housing 110 may be, but not limited to, a single housing or a housing partitioned into two or more parts in order to support the main membrane module 210 and the sub-membrane module 230.

The housing 110 may further include various accessory components such as various brackets, blocks, protrusions, ribs, collars, or the like, for supporting the main membrane module 210 and the sub-membrane module 230.

However, in the exemplary embodiment of the present invention, since the above-mentioned various accessory components are to install the main membrane module 210 and the sub-membrane module 230 to be further described below in the housing 110, the above-mentioned various accessory components will be collectively referred to as the housing 110 except for an exceptional case.

According to an exemplary embodiment of the present invention, in the main membrane module 210, membrane humidification may be performed by exchanging moisture between gas and gas, such as the exhaust gas exhausted from the cathodes 13 of the fuel cells and the dried air supplied from the air compressor 30.

The main membrane module 210 may exhaust the humidification air obtained by membrane humidification through moisture exchange of the exhaust gas and the dried air and supply the humidification air to the cathodes 13 of the fuel cells 11.

This main membrane module 210 may include several bundles of first hollow-fiber membranes 211 densely disposed in the housing 110. In particular, the main membrane module 210 may be fixed in the housing 110 by a support unit made of a polymer material.

According to an exemplary embodiment of the present invention, in the sub-membrane module 230, membrane humidification may be performed by exchanging moisture between the exhaust gas exhausted from the cathodes 13 of the fuel cells and the dried air supplied from the air compressor 30, separately from the main membrane module 210.

The sub-membrane module 230 may exhaust separate humidification air obtained by membrane humidification through moisture exchange of the exhaust gas and the dried air and supply the humidification air to the air inflow end of the air compressor 30.

The sub-membrane module 230 may be connected to the main membrane module 210 in the housing 110 and include several bundles of second hollow-fiber membranes 231 densely disposed in the housing 110. In particular, the sub-membrane module 230 may be fixed in the housing 110 by a support unit made of a polymer material.

Meanwhile, the main membrane module 210 and the sub-membrane module 230 according to an exemplary embodiment of the present invention may be provided integrally with each other in the housing 110 as described above.

Further, the main membrane module 210 and the sub-membrane module 230 according to an exemplary embodiment of the present invention may be provided in the housing 110 to be partitioned from each other by a partition wall 115.

In the housing 110 as described above, a manifold may supply the exhaust gas exhausted from the cathodes 13 of the fuel cells 11 and dried air supplied through the air compressor 20 to each of the main membrane module 210 and the sub-membrane module 120. The manifold may also exhaust the humidification air obtained by membrane humidification through moisture exchange of the exhaust gas and the dried air in the main membrane module 210 and the sub-membrane module 230, and further exhaust gas in which moisture is removed to the outside.

In particular, the housing 110 may include: a first inflow part 131 for introducing the dried air supplied through the air compressor 30 into the main membrane module 210; a second inflow part 132 for introducing a portion of the dried air supplied through the air compressor 30 into the sub-membrane module 230; and a third inflow part 133 for introducing the exhaust gas exhausted from the cathodes 13 of the fuel cells 11 into the main membrane module 210.

In addition, a fourth inflow part 134 as a connection hole 136 connecting the main membrane module 210 and the sub-membrane module 230 to each other may be formed at the partition wall 115 partitioning the main membrane module 210 and the sub-membrane module 230 from each other in the housing 110.

The fourth inflow part 134 as described above may introduce the exhaust gas introduced into the main membrane module through the third inflow part 133 to the sub-membrane module 230 through the connection hole 136.

In addition, the housing 110 may further include: a first exhaust part 151 for exhausting the humidification air humidified in the main membrane module 210; a second exhaust part 152 for exhausting the humidification air humidified in the sub-membrane module 230; and a third exhaust part 153 for exhausting gas in which moisture is removed while the gas passes through the sub-membrane module 220 from the main membrane module 210.

In the housing 110 as described above, the first inflow part 131 may be connected to an air outflow end of the air compressor 30 through the dried air supply line 71. Accordingly, the main membrane module 210 may be connected to the air outflow end of the air compressor 30 through the first inflow part 131 and the dried air supply line 71. As such, according to an exemplary embodiment of the present invention, the dried air supplied from the air compressor 30 may be supplied to the main membrane module 210 through the dried air supply line 71.

The second inflow part 132 may be connected to the air outflow end of the air compressor 30 through a divergence line 73 diverged from the dried air supply line 71. Accordingly, the sub-membrane module 230 may be connected to the dried air supply line 71 through the second inflow part 132 and the divergence line 73, and connected to the air outflow end of the air compressor 30 through the dried air supply line 71. As such, according to the exemplary embodiment of the present invention, during a process of supplying the dried air from the air compressor 30 through the dried air supply line 71, a portion of the dried air may be supplied to the sub-membrane module 230 through the divergence line 73 diverged from the dried air supply line 71.

The third inflow part 133 may be connected to the cathodes 13 of the fuel cells 11 through an air exhaust line 75. Accordingly, the main membrane module 210 may be connected to the cathodes 13 of the fuel cells 11 through the third inflow part 133 and the air exhaust line 75. As such, according to an exemplary embodiment of the present invention, the high temperature and high humidity exhaust gas exhausted from the cathodes 13 of the fuel cells 11 may be supplied to the main membrane module 210 through the air exhaust line 75.

The fourth inflow part 134 formed in the partition wall 115 as described above may connect the main membrane module 210 and the sub-membrane module 230 to each other and introduce the exhaust gas introduced into the main membrane module 210 through the third inflow part 133 into the sub-membrane module 230.

The first exhaust part 151 may be connected to the cathodes 13 of the fuel cells 11 through a humidification air supply line 77. Accordingly, the main membrane module 210 may be connected to the cathodes 13 of the fuel cells 11 through the first exhaust part 151 and the humidification air supply line 77. As such, according to an exemplary embodiment of the present invention, the humidification air exhausted through the first exhaust line of the main membrane module 210 may be supplied to the cathodes 13 of the fuel cells 11 through the humidification air supply line 77.

The second exhaust part 152 may be connected to the air inflow end of the air compressor 30 through a circulation line 79. Accordingly, the sub-membrane module 230 may be connected to the air inflow end of the air compressor 30 through the second exhaust part 152 and the circulation line 79. As such, according to an exemplary embodiment of the present invention, the humidification air exhausted through the second exhaust part 152 of the sub-membrane module 230 may be supplied or circulated to the air inflow end of the air compressor 30 through the circulation line 79, and thus, the dried air compressed in the air compressor 30 may be cooled by the humidification air.

In addition, the third exhaust part 153 which is connected to the sub-membrane module 230 may exhaust the exhaust gas in which moisture is removed while the exhaust gas passes through the sub-membrane module 230 from the main membrane module 210 to the outside or to the air.

Hereinafter, operations of the humidification device 200 for a fuel cell according to an exemplary embodiment of the present invention configured as described above and the fuel cell system 100 comprising the same will be described in detail with reference to the above-mentioned drawings and the accompanying drawings.

Figure 3:
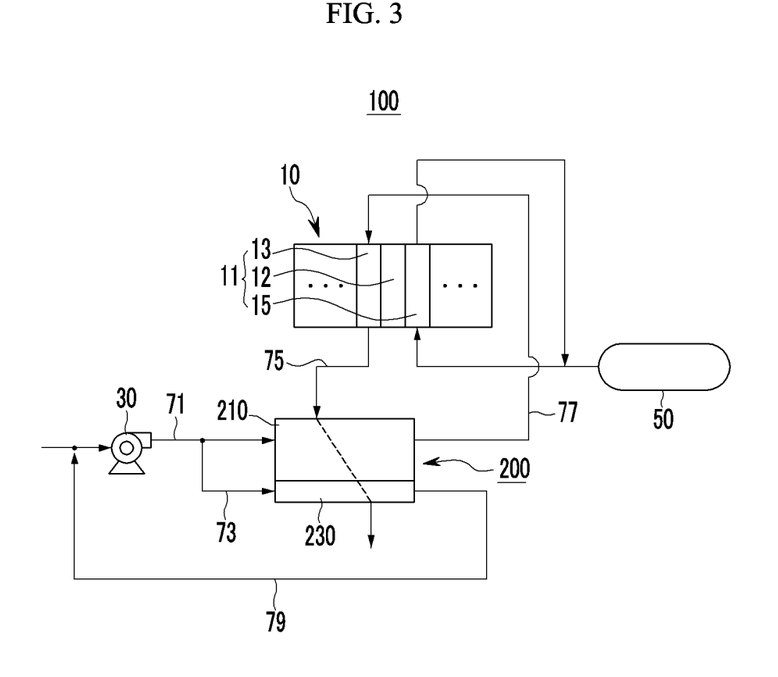
FIG. 3 shows an exemplary operation of the fuel cell system according to an exemplary embodiment of the present invention.

FIG. 3 shows an exemplary operation of an exemplary fuel cell system according to an exemplary embodiment of the present invention.

As shown in FIG. 3, according to an exemplary embodiment of the present invention, first, during a process of generating electric energy as electrochemical reactions of hydrogen and air by the fuel cells 11 of the stack 10, high temperature and high humidity exhaust gas may be exhausted from the cathodes 13 of the fuel cells 11.

Thereafter, according to an exemplary embodiment of the present invention, the exhaust gas exhausted from the cathodes 13 of the fuel cells 11 may be supplied to the main membrane module 210 through the air exhaust line 75 and the third inflow part 133.

According to an exemplary embodiment of the present invention, during this process, the dried air supplied through the air compressor 30 may be supplied to the main membrane module 210 through the dried air supply line 71 and the first inflow part 131.

Here, according to an exemplary embodiment of the present invention, during a process of supplying the dried air supplied from the air compressor 30 to the main membrane module 210 through the dried air supply line 71, a portion of the dried air may be supplied to the sub-membrane module 230 through the divergence line 73 diverged from the dried air supply line 71 and the second inflow part 132.

According to various exemplary embodiments of the present invention, membrane humidification may be performed by exchanging moisture between gas and gas, or alternatively, by exchanging moisture between the exhaust gas and the dried air in the main membrane module 210. The humidification air may be subsequently exhausted through the first exhaust part 151. In particular, the humidification air may be supplied to the cathodes 13 of the fuel cells 11 through the humidification air supply line 77.

During the above-mentioned processes, the exhaust gas passing through the main membrane module 210 may be supplied to the sub-membrane module 230 in a moisture containing state through the fourth inflow part 134.

As such, membrane humidification by exchanging moisture between the exhaust gas and dried air may be performed in the sub-membrane module 230, and the humidification air may be exhausted through the second exhaust part 152.

Subsequently, according to an exemplary embodiment of the present invention, the humidification air exhausted through the second exhaust part 152 as described above may be circulated to the air inflow end of the air compressor 30 through the circulation line 79.

Accordingly, the humidification air containing moisture may be introduced into the air compressor 30 by circulating the humidification air exhausted from the sub-membrane module 230 to the air inflow end of the air compressor 30.

As consequent, according to an exemplary embodiment of the present invention, the temperature of the air compressed in the air compressor 30 may be reduced, and configuration components of the air compressor 30 such as a compression part, a driving motor, a bearing, and the like may be cooled by the compressed air of which the temperature is cooled, thereby improving aerodynamic performance and efficiency of the air compressor 30.

Further, according to an exemplary embodiment of the present invention, as the humidification air exhausted from the sub-membrane module 230 is circulated to the air inflow end of the air compressor 30, relative humidity of air supplied to the humidification device 200 may increase, such that a load of the humidification device 200 may decrease, humidification performance of the humidification device 200 may be improved, and a size of the humidification device 200 may also decrease.

Meanwhile, as described above, the exhaust gas passing through the main membrane module 210 and the sub-membrane module 230 may be exhausted to the air through the third exhaust part 153 in a state in which moisture is removed.

In the humidification device 200 for a fuel cell according to an exemplary embodiment of the present invention and the fuel cell system 100 comprising the humidification device 200 as described above, a separate cooling unit such as an intercooler and a water pump as in the related art may be omitted by cooling the temperature of the air compressed in the air compressor 30 and circulating the humidification air exhausted from the sub-membrane module 230 to the air inflow end of the air compressor 30.

In addition, according to an exemplary embodiment of the present invention, since the cooling unit such as the intercooler is omitted, delay of a cold start time for raising a temperature of coolant of the intercooler in winter may be prevented, and thus, a cold start time of the fuel cell system may be shortened.

In addition, according to an exemplary embodiment of the present invention, a predetermined amount of air may be re-circulated to the air compressor 30 through the sub-membrane module 230 at high power operation of the stack 10, thereby avoiding a surge line of the air compressor 30. As such, the air compressor 30 may stably operate.

Further, according to an exemplary embodiment of the present invention, since the sub-membrane module 230 is provided below the main membrane module 210, condensation water gathered at a lower end of the humidification device 200 may be removed and utilized through humidification of the sub-membrane module 230.

Furthermore, according to an exemplary embodiment of the present invention, since the separate cooling unit such as the intercooler, the water pump, and the like, as in the related art may be omitted, and the size of the humidification device 200 may decrease, thereby reducing a package of the entire fuel cell system 100.

In addition, according to an exemplary embodiment of the present invention, as the separate cooling unit such as the intercooler, the water pump, and the like, as in the related art may be omitted, various components provided in these cooling unit such as valves, nozzles, and the like, may not be required, such that damages of the components caused by the freezing of water at a low temperature may be prevented.

Meanwhile, hereinafter, Comparative Examples will be described as compared to the humidification device 200 for a fuel cell according to an exemplary embodiment of the present invention and the fuel cell system 100 comprising the same.

Figure 4:
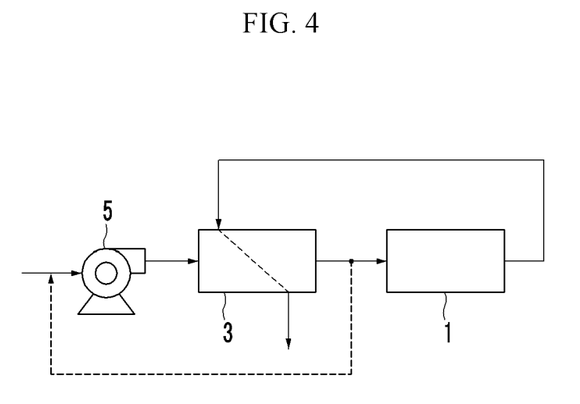
FIGS. 4 and 5 show Comparative Examples for describing an exemplary operation effect of an exemplary fuel cell system according to an exemplary embodiment of the present invention.
Figure 5:
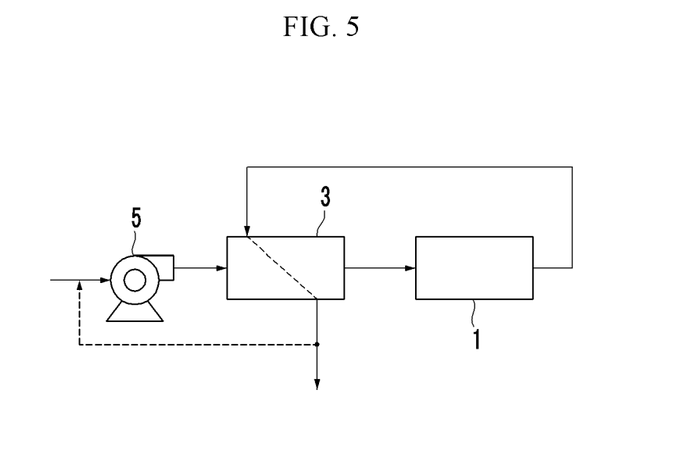

FIGS. 4 and 5 show Comparative Examples for describing an operation effect of the fuel cell system according to an exemplary embodiment of the present invention.

As shown in FIG. 4, in a first comparative example compared to an exemplary embodiment of the present invention, during a process of supplying exhaust gas exhausted from a stack 1 to a humidification device 3, supplying dried air supplied from an air compressor 5 to the humidification device 3, and supplying humidification air exhausted from the humidification device 3 to the stack 1, a portion of the humidification air may be circulated to an air inflow end of the air compressor 5 as represented by a dotted line arrow.

In the first comparative example as described above, the cooling unit such as the intercooler as in the related art may be omitted, but condensation water in the humidification device 3 may not be removed and utilized. In addition, a temperature of the humidification air may be substantially high, such that cooling efficiency of the air compressor 5 may deteriorate as compared to an exemplary embodiment of the present invention.

In FIG. 5, in a second comparative example compared to an exemplary embodiment of the present invention, during a process of supplying exhaust gas exhausted from a stack 1 to a humidification device 3, supplying dried air supplied from an air compressor 5 to the humidification device 3, and supplying humidification air exhausted from the humidification device 3 to the stack 1, the exhaust gas exhausted from the humidification device 3 in a state in which moisture is removed may be circulated to an air inflow end of the air compressor 5 as represented by a dotted line arrow.

As in the second comparative example as described above, the cooling unit such as the intercooler, and the like, as in the related art may be omitted, but since a nitrogen concentration in the exhaust gas is substantially high, a nitrogen concentration in the air introduced into the stack 1 may increase, such that performance of the stack 1 may deteriorate as compared to an exemplary embodiment of the present invention.

Hereinabove, although various exemplary embodiments of the present invention are described, the spirit of the present invention is not limited to the embodiments set forth herein and those skilled in the art and understanding the present invention can easily accomplish other embodiments included in the spirit of the present invention by the addition, modification, and removal of components within the same spirit, but those are construed as being included in the spirit of the present invention.

What is claimed is:

1. A humidification device for a fuel cell, which performs membrane humidification of exhaust gas exhausted from a cathode of a fuel cell and dried air supplied through an air compressor and supplies humidification air to the cathode, comprising:
   a main membrane module including several bundles of first hollow-fiber membranes disposed in the main membrane; and
   a sub-membrane module connected to the main membrane module and including several bundles of second hollow-fiber membranes disposed in the sub-membrane module,
   wherein the sub-membrane module is connected to an air inflow end of the air compressor through a circulation line, and supplies the humidification air to the air inflow end of the air compressor through the circulation line.

2. The humidification device for a fuel cell of claim 1, wherein the humidification air exhausted from the main membrane module is supplied to the cathode of the fuel cell, and the humidification air exhausted from the sub-membrane module is supplied to the air inflow end of the air compressor.

3. The humidification device for a fuel cell of claim 1, wherein the sub-membrane module is connected to a dried air supply line for supplying the dried air compressed in the air compressor to the main membrane module, but connected to an air output end of the air compressor through a divergence line diverged from the dried air supply line.

4. The humidification device for a fuel cell of claim 1, wherein the main membrane module and the sub-membrane module are provided integrally with each other in a single housing.

5. The humidification device for a fuel cell of claim 4, wherein the main membrane module and the sub-membrane module are partitioned from each other by a partition wall in the housing.

6. The humidification device for a fuel cell of claim 5, wherein the housing includes:
   a first inflow part introducing the dried air supplied through the air compressor into the main membrane module;
   a second inflow part introducing a portion of the dried air supplied through the air compressor into the sub-membrane module;
   a third inflow part introducing the exhaust gas exhausted from the cathode of the fuel cell into the main membrane module;
   a fourth inflow part formed in the partition wall, connecting the main membrane module and the sub-membrane module to each other, and introducing the exhaust gas into the sub-membrane module;
   a first exhaust part exhausting the humidification air humidified in the main membrane module;
   a second exhaust part exhausting the humidification air humidified in the sub-membrane module; and
   a third exhaust part exhausting exhaust gas in which moisture is removed while the exhaust gas passes through the sub-membrane module from the main membrane module.

7. The humidification device for a fuel cell of claim 6, wherein the first inflow part is connected to an air output end of the air compressor through a dried air supply line, the second inflow part is connected to the air output end of the air compressor through a divergence line diverged from the dried air supply line, and the second exhaust part is connected to the air inflow end of the air compressor through the circulation line.

8. The humidification device for a fuel cell of claim 6, wherein the fourth inflow is formed of a connection hole connecting the main membrane module and the sub-membrane module to each other.

9. A fuel cell system comprising:
   a stack formed of an electricity generation assembly of unit fuel cells;
   an air compressor for supplying air to a cathode of a fuel cell;
   a humidification device connected to the air compressor and performing membrane humidification of exhaust gas exhausted from the cathode and dried air supplied through the air compressor; and
   a hydrogen tank for supplying hydrogen to an anode of the fuel cell;
   wherein the humidification device includes a main membrane module including several bundles of first hollow-fiber membranes disposed in the main membrane module and a sub-membrane module connected to the main membrane module and including several bundles of second hollow-fiber membrane disposed in the sub-membrane module, and
   wherein humidification air exhausted from the sub-membrane module is supplied to an air inflow end of the air compressor through a circulation line, and dried air compressed in the air compressor is cooled by the humidification air.

10. The fuel cell system of claim 9, wherein the humidification device supplies the dried air supplied from the air compressor to the main membrane module through a dried air supply line, supplies a portion of the dried air to the sub-membrane module through a divergence line diverged from the dried air supply line, supplies the humidification air exhausted from the main membrane module to the cathode of the fuel cell through a humidification air supply line, and supplies humidification air exhausted from the sub-membrane module to the air inflow end of the air compressor through the circulation line.

11. The fuel cell system of claim 9, wherein the main membrane module and the sub-membrane module are provided integrally with each other in a single housing and partitioned from each other by a partition wall in the housing.

12. The fuel cell system of claim 11, wherein the housing includes,
- a first inflow part introducing the dried air supplied through the air compressor into the main membrane module,
- a second inflow part introducing a portion of the dried air supplied through the air compressor into the sub-membrane module,
- a third inflow part introducing the exhaust gas exhausted from the cathode of the fuel cell into the main membrane module,
- a fourth inflow part formed in the partition wall, connecting the main membrane module and the sub-membrane module to each other, and introducing the exhaust gas into the sub-membrane module;
- a first exhaust part exhausting the humidification air humidified in the main membrane module;
- a second exhaust part exhausting the humidification air humidified in the sub-membrane module;
- a third exhaust part exhausting exhaust gas in which moisture is removed while the exhaust gas passes through the sub-membrane module from the main membrane module.

13. The fuel cell system of claim 12, wherein the first inflow part is connected to an air output end of the air compressor through a dried air supply line, the second inflow part is connected to the air output end of the air compressor through a divergence line diverged from the dried air supply line, and the third inflow part is connected to the cathode of the fuel cell through an air exhaust line, the first exhaust part is connected to the cathode of the fuel cell through a humidification air supply line, and the second exhaust part is connected to the air inflow end of the air compressor through the circulation line.

14. A vehicle comprising the fuel cell system of claim 9.

* * * * *